United States Patent
Lee

(10) Patent No.: US 6,473,416 B1
(45) Date of Patent: Oct. 29, 2002

(54) TRANSMISSION APPARATUS FOR CDMA COMMUNICATION SYSTEM

(75) Inventor: Kyung Kuk Lee, Seoul (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/223,747

(22) Filed: Dec. 31, 1998

(30) Foreign Application Priority Data

Nov. 23, 1998 (KR) .............................. 98-50260

(51) Int. Cl.[7] ............................... H04B 1/00
(52) U.S. Cl. ......................... 370/342; 455/91
(58) Field of Search ............... 370/342; 455/91, 455/116, 114, 126

(56) References Cited

U.S. PATENT DOCUMENTS

| | | | | |
|---|---|---|---|---|
| 5,132,634 A | * | 7/1992 | Suarez | 455/116 |
| 5,278,994 A | * | 1/1994 | Black | 455/126 |
| 5,426,641 A | * | 6/1995 | Afrashteh | 455/116 |
| 5,509,011 A | * | 4/1996 | Birth | 455/116 |

* cited by examiner

*Primary Examiner*—Brian Zimmerman
(74) *Attorney, Agent, or Firm*—Fleshner & Kim, LLP

(57) ABSTRACT

A transmission apparatus for a CDMA communication system. The apparatus includes a multiplexer for multiplexing CDMA signals inputted through a plurality of channels, a voltage limiter for limiting a voltage of the multiplexed signal to a predetermined voltage level, an up-converter for up-converting the signal inputted from the voltage limiter into a high frequency signal, and a high power amplifier for amplifying the up-converted signal to a predetermined power level, for thereby decreasing an input voltage inputted into a high output amplifier, being used for a plurality of subscriber channels and using a low price high output amplifier.

7 Claims, 5 Drawing Sheets

- Average power : 1
- PAR : 1
- Peak power : 1

—Average power : 2
—PAR : 2
—Peak power : 4

—Average power : N
—PAR : N
—Peak power : $N^2$

TRANSMISSION APPARATUS FOR CDMA COMMUNICATION SYSTEM

BACKGROUND OF THE INVENTION

1. Field of the Invention

The present invention relates to a communication system, and in particular to a transmission apparatus for a CDMA communication system.

2. Description of the Conventional Art

Generally, in the cellular communication system, in order to decrease the effects of any interference, a spectrum spreading technique capable of more widely spreading a carrier spectrum compared to an information ratio is used. As a CDMA spectrum spreading technique, there are known a direct spreading method (DS: Direct Sequence) and a frequency hopping (FH) method.

The DS-CDMA method is directed to spreading an information signal into a designated spectrum region by modulating the information signal using an ideally random spreading code. Actually, as the above-described spreading code, the sequence of the psuedorandom numbers which is a signal stream repeating at a long period is used.

In addition, a receiver reversely spreads the spread signal using a reverse spreading code which is the same as the spreading code.

The above-described operation will be explained with reference to the following equations.

The spreading operation at the side of a transmissiol may be expressed as follows.

$$y(t)=a(t) \cdot c(t) \tag{1}$$

where the audio data which is first modulated to a PCM signal is a(t), the PN code is c(t), and the wave form transmitted is y(t).

Assuming that the signal at the side of the transmission is not decreased, and there is not any interference or noise, the wave form at the side of the receiving is y(t), and the reverse spreading output z(t) may be expressed as follows because the code same as the spreading code c(t) is multiplied.

$$z(t)=y(t) \cdot c(t)=a(t) \cdot \{c(t)\}^2 \tag{2}$$

Here, since c(t) is the sequence of the random numbers which is defined as +1 or −1. therefore, when squaring c(t), a result of the computation is 1. Therefore, z(t) may be expressed as follows.

$$z(t)=a(t) \tag{3}$$

Therefore, it is possible to recover the original data a(t) based on the reverse spreading process. Here, at the side of the receiving, it is needed to generate the wave form which is the same as the side of the transmission at the same time. The PN code is preferably a random number. If the PN code is the random number, since it is impossible to represent the condition that the sequences of the random numbers at the sides of the transmission and receiving are absolutely identical, the sequence of the psuedorandom numbers is used.

As described above, the DS-CDMA communication apparatus provided a communication service to a plurality of subscribers through a transceiver base station in a neighboring region. Since one base station is designed to provide a communication service to a plurality of communication apparatuses at the same time in the identical regions, a plurality of CDMA signals should be transmitted/received at the same time.

In order to effectively performed the above-described operation, a plurality of transceivers and antenna may be provided to one base station. However, this method is too expensive. Therefore, as a more economical method, there is a method capable of performing a signal transmitting/receiving operation using a transceiver capable of transmitting/receiving a plurality of signals through one antenna.

In order to implement a transmission/receiving operation of a plurality of CDMA signals through a common antenna, the outputs of each CDMA channel are combined for thereby amplifying the outputs and then transmitting the same through a transmission antenna.

When transmitting a plurality of CDMA signals, a HPA (High Power Amplifier) capable of computing the peak power, and amplifying the peak power at a predetermined amplification ratio in the linear amplification region of the amplifier is used.

The HPA is an amplifier capable of outputting the same output as a value obtained by multiplying the average power used for transmitting the data based on one CDMA channel by the PAR (Peak to Average Ratio) based on the average ratio.

For example, when transmitting the signals of 30 channels based on 1 Watt per channel, the HPA amplifier having the peak power (PP) computed based on the following Equation 4 is needed.

$$PP=CP*CH*PAR=AP*PAR=1 \text{ Watt} * 30Ch. * 30=900 \text{ Watt} \tag{4}$$

PP=Peak Power (Watt)
CP=Channel Power (Watt)
CH=The number of channels
AP=Average Power (Watt)
PAR=Peak to Average Ratio Namely, the amplifier used for a transceiver of the CDMA base station is an amplifier having a peak power of 900 Watt which is the linear amplification region.

The operation that the transmission power of the signal transmitted from the conventional CDMA base station is controlled and then transmitted will be explained with reference to the accompanying drawings.

FIG. 1 is a block diagram illustrating a part of the transmission apparatus for a CDMA base station capable of transmitting a plurality of CDMA signals through one antenna, and FIGS. 2A and 2C are views illustrating an output level for explaining an output in accordance with the number of channels of the CDMA type.

As shown in FIG. 1, the conventional transmission apparatus of the base station transmission includes a MUX (Multiplexer) 10 for multiplexing the CDMA signals inputted through a plurality of channels CH.1 through CH.n, an up-converter 20 for combining the multiplexed signals and a clock signal generated by a local oscillator 30 and then converting the signals into a high frequency signal, a HPA (High Power Amplifier) 40 for amplifying the up-converted signals to a predetermined transmission power level, and a duplexer 50 for transmitting the amplified signal through an antenna or transmitting the signals received through the antenna to the side of the receiving apparatus.

The data transmission of the conventional CDMA base station will be explained. When the CDMA signals inputted through the channels CH.1 through CH.n are multiplexed by the multiplexer 10 for thereby outputting one signal, the up-converter 20 combines the multiplexed signal with a clock signal generated by the local oscillator 30 and converts the signal into a high frequency and amplifies the same for thereby driving the high power amplifier 40.

The high power amplifier 40 amplifies the inputted signal to a predetermined level in accordance with a predetermined amplification ratio. The thusly amplified signal is applied to the duplexer 60 and is outputted through the antenna.

Here, the output levels at the high power amplifier 50 will be explained in more detail with reference to FIG. 2.

First, as shown in FIG. 2A, when transmitting a signal at one channel needing 1 Watt as a final output, the values of the average power of 1 Watt based on one input channel, and the peak power 1 based on the average ratio are obtained. Therefore, the linear amplifier 50 having the peak power of 1 Watt is needed.

In another example, as shown in FIG. 2B, when the signals are inputted from two channels, the values of the average power of 2 Watt based on two channels, and the peak power 2 based on the average ratio are obtained. Therefore, the peak power is 4 Watt based on Equation 4.

As shown in FIG. 2C, when the signals are inputted from a N-number of channels, the values of the average power of N-Watt based on the N-number of channels, and the peak of N based on the average ratio are obtained. Therefore, the peak power of $N^2$ watt is obtained based on Equation 4.

In other words, the HPA 50 having a peak power as much as the value obtained by multiplying the average power based on a plurality of channels by the PAR based on the average ratio is needed at the final output terminal of the CDMA base station transmission apparatus.

However, the high power amplifier 50 is expensive. As the power of the same is increased, the price of the same is increased.

In addition, a lot heat is generated from the high power amplifier, a heat radiating apparatus having a high capacity is additionally used, so that the size of the entire transceiver of the CDMA base station using the high power amplifier 50 is increased, and the power consumption of the high power amplifier 50 is increased.

SUMMARY OF THE INVENTION

Accordingly, it is an object of the present invention to provide a transmission apparatus for a CDMA communication system which is capable of decreasing an input voltage inputted into a high output amplifier, being used for a plurality of subscriber channels and using a low price high output amplifier.

To achieve the above object, there is provided a CDMA communication system which includes a multiplexer for multiplexing CDMA signals inputted through a plurality of channels, a voltage limiter for limiting a voltage of the multiplexed signal to a predetermined voltage level, an up-converter for up-converting the signal inputted from the voltage limiter into a high frequency signal, and a high power amplifier for amplifying the up-converted signal to a predetermined power level.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 2A through 2C are wave form diagrams of an output level of a high output amplifier, of which:

FIG. 2A is a wave form diagram in the case of one CDMA channel;

FIG. 2B is a wave form diagram in the case of two CDMA channels; and

FIG. 2C is a wave form diagram in the case of a N-number of CDMA channels;

FIGS. 5A and 5B are graphs illustrating an input/output voltage of a high output amplifier according to the present invention, of which:

FIG. 5A is a graph illustrating a region in which an error is previously generated based on a signal generation probability distribution in accordance with an input voltage in a high output amplifier according to the present invention; and FIG. 5B is a graph illustrating a probability distribution of a signal inputted into an input terminal of a high output amplifier according to the present invention.

DETAILED DESCRIPTION OF THE PREFERRED EMBODIMENTS

The power control and transmission operations of a transmission signal at the CDMA communication system according to the present invention will be explained with reference to the accompanying drawings.

Figure 1:
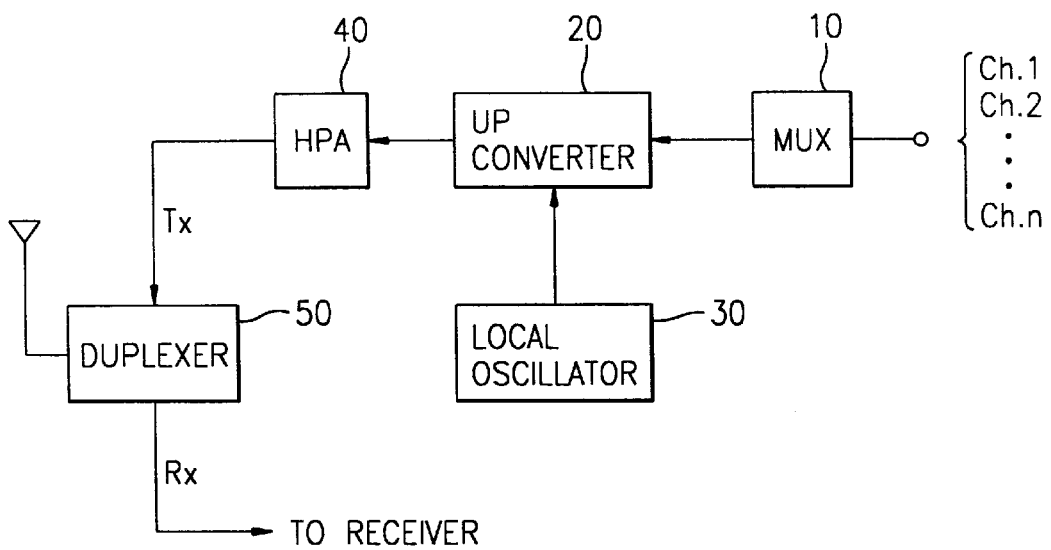
FIG. 1 is a block diagram illustrating a conventional transmission apparatus for a CDMA base station.
Figure 2A:
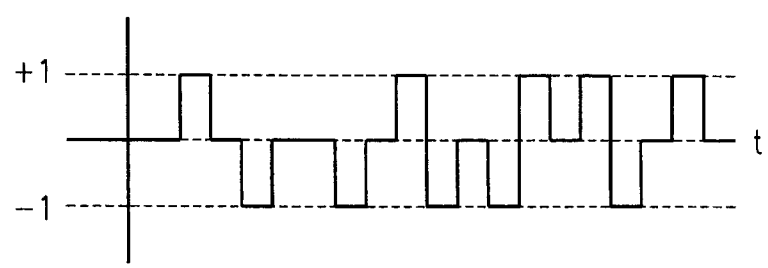
Figure 2B:
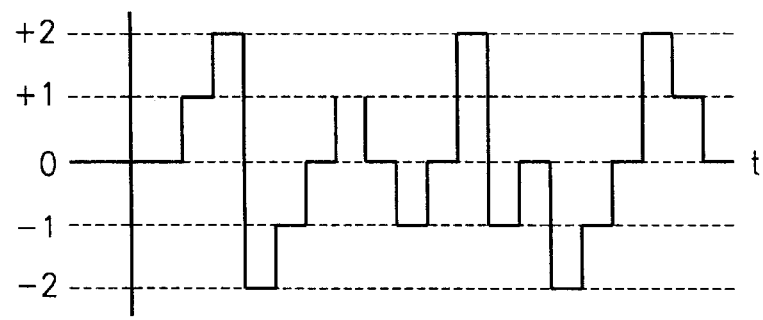
Figure 2C:
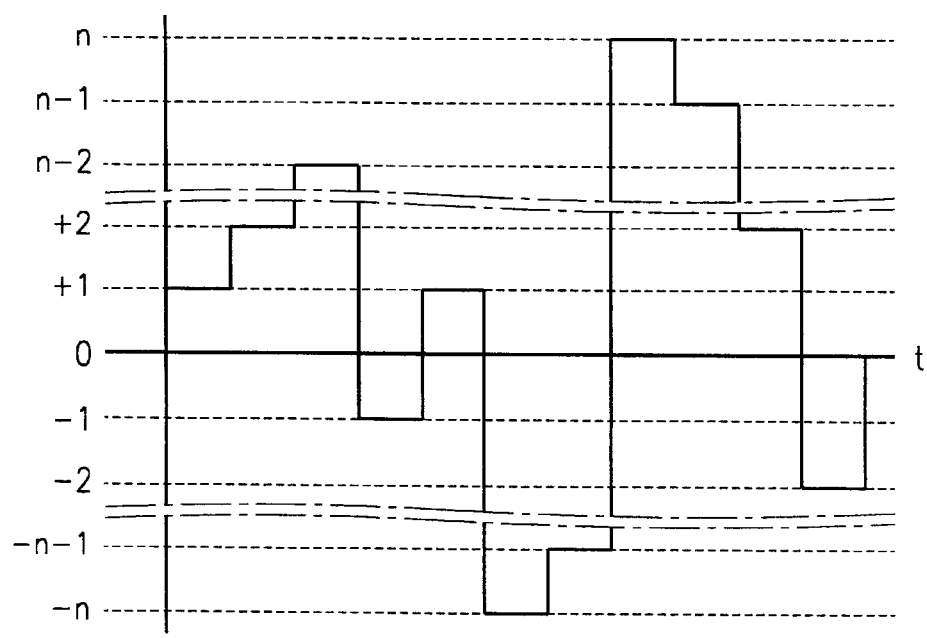
Figure 3:
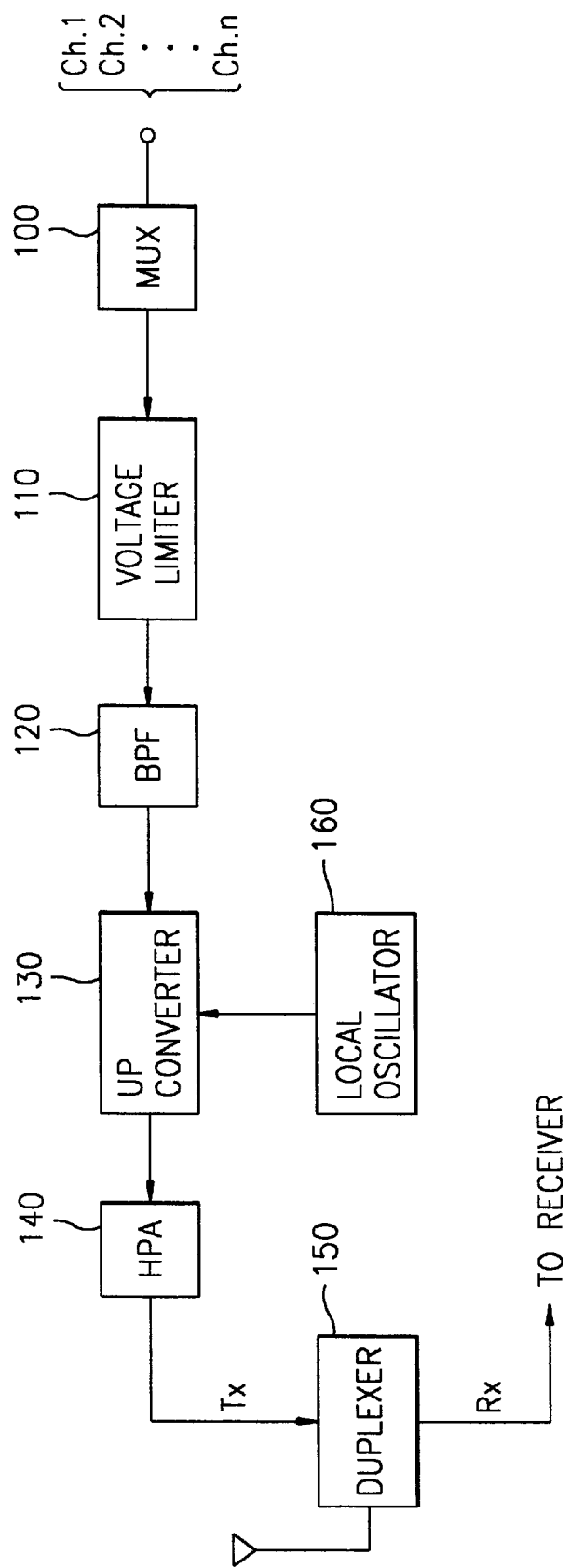
FIG. 3 is a block diagram illustrating a transmission apparatus for a CDMA base station according to the present invention.

FIG. 3 is a block diagram illustrating a part of the transmission apparatus for a CDMA base station according to the present invention.

As shown therein, the transmission apparatus for a CDMA base station according to the present invention includes a multiplexer 100 for multiplexing CDMA signals inputted through a plurality of channels CH.1 through CH.n, a voltage limiter 110 for limiting the voltage of the multiplexed signal, a BPF (Band Pass Filter) 120 for removing the signals out of a predetermined frequency band among the output signals from the voltage limiter 110, an up-converter 130 for combining the filtered signal and a clock signal generated by the local oscillator 160, a high power amplifier 130 for amplifying the up-converted signal to a predetermined transmission power level, and a duplexer 150 for transmitting the amplified signal through an antenna or transmitting the signal received through the antenna to the side of the receiving apparatus.

The transmission apparatus for a CDMA base station according to the present invention will be explained in more detail.

First, the multiplexer 100 multiplexes the CDMA signals inputted from the channels CH.1 through CH.n and outputs one signal, and the voltage limiter 110 limits the voltage of the signal at a predetermined level.

Figure 4:
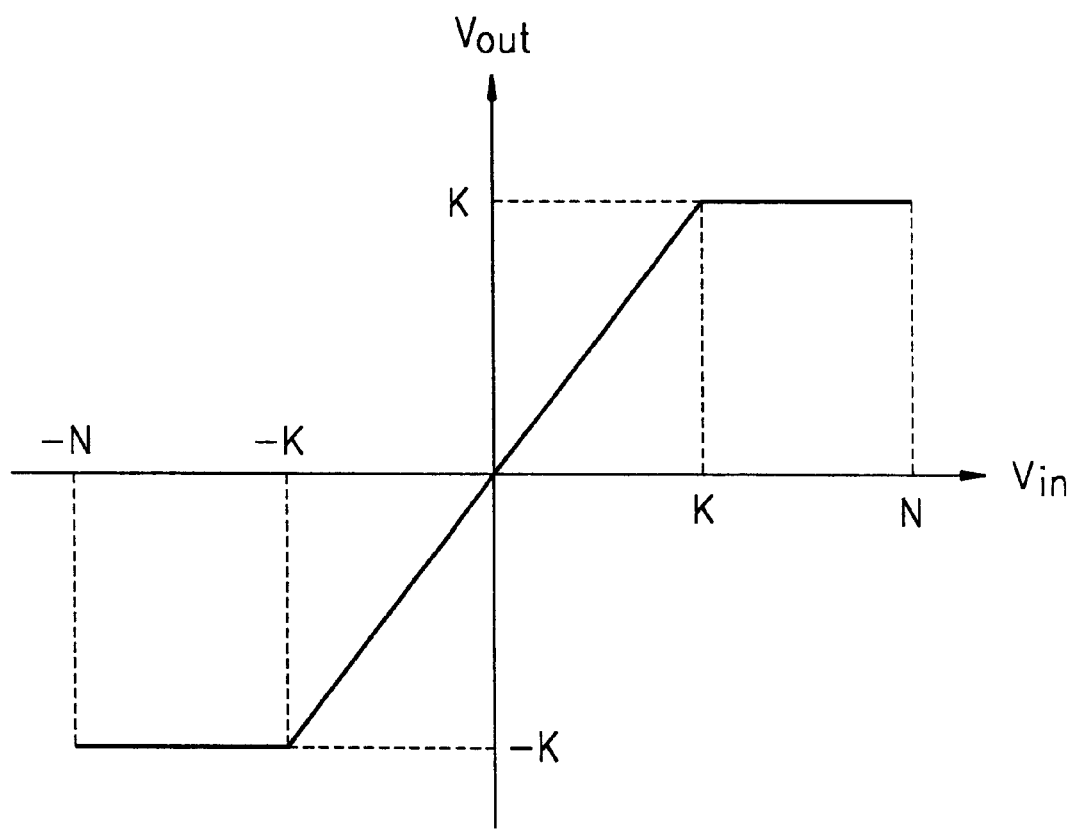
FIG. 4 is a wave form diagram of an input/output signal from the voltage limiter of FIG. 3.

Namely, as shown in FIG. 4, the voltage limiter 110 outputs the voltage above the K-volt as the K-volt level voltage so that a predetermined level(K) signal is not outputted.

In addition, a predetermined band width signal among the signals inputted from the voltage limiter 110 is filtered by the BPF 120, and the up-converter 130 combines the filtered signal and a clock signal generated by the local oscillator 160, and the thusly combined signal is converted into a high frequency.

The high power amplifier 140 amplifies the inputted signal to a predetermined power level required in accordance with a predetermined amplification ratio, and the thusly amplified signal is applied to the duplexer 150 and is transmitted through the antenna.

Here, the characteristic of the input/output voltage of the high power amplifier 140 which is varied by limiting the voltage of the signal transmitted from the voltage limiter 110 will be explained in detail.

According to the digital information transmitted through a public line based on the standard of the digital transmission system of Qualcomm of the U.S.A. which disclosed the CDMA digital communication, the digital information transmitted trough the public line should be below $10^{-2}$ through $10^{-3}$ in the case that the bit error occurrence ratio of the digital signal is a voice signal, and the same should be below $10^{-6}$ in the case of the data signal.

In other words, the above-described recommendation represents that the digital signal which is inputted through the digital transceiver generates an error below the above-described error standard to the side of the transmission.

Namely, in the case of the N-number of the channels, the peak power which is below the $N^2$ watt which is the peak power is recommended, so that the error ratio at the earlier stage is 1/10 through 1/100 compared to the error standard. In this state, if the error which may not affect the digital signal error standard of the Qualcomm Co. is generated, an actual voice communication of the subscriber is not affected, and the high power amplifier which may be used in the case of the lower power may be used.

Figure 5A:
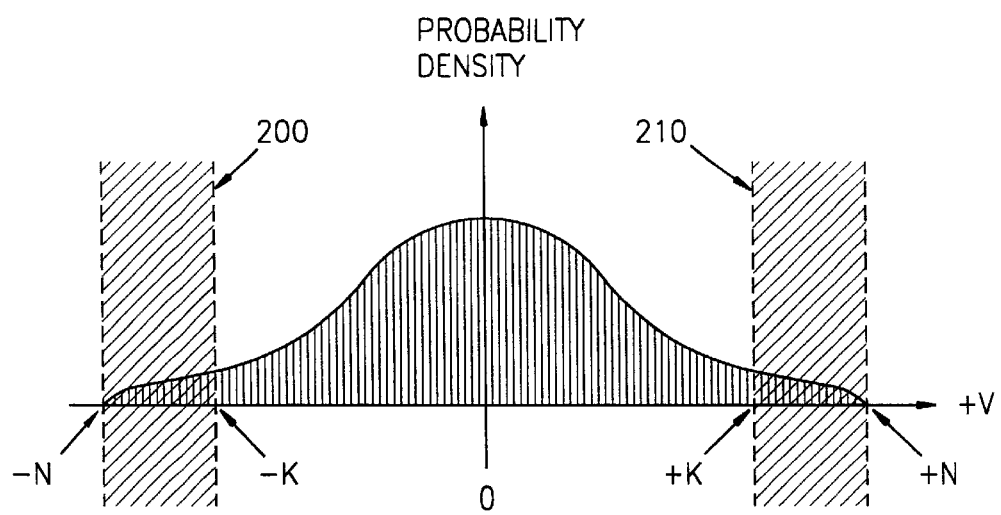
Figure 5B:
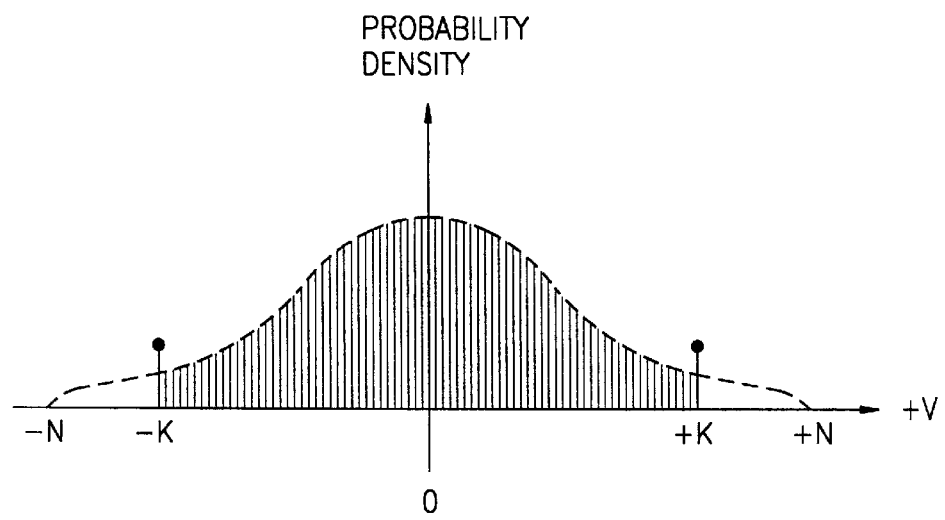

Namely, in more detail, as shown in FIGS. 5A and 5B, in view of the signal occurrence probability with respect to the input voltage of the high power amplifier, as the voltage becomes lower, the occurrence probability of the signal becomes higher, and in the case of the higher voltage, the probability is geometrically decreased.

As shown in FIG. 5A, assuming that the signals code-spread by the channel in the case of the N-number of channels all have +1V or −1V, the signal occurrence probability with respect to the voltage after the signals of each subscriber channel are multiplexed has a binomial distribution.

At this time, the portion in which the voltage level is near +N or −N, the probability of the signal occurrence is in proportion to $2^{-N}$.

Therefore, if N is relatively large, the occurrence probability becomes very small.

For example, assuming that N is 30, the probability that 30 channels occur as +1V or −1V at the same time, namely, the probability that the output voltage of the multiplexer 100 is +30V or −30V, is $2 \times 2^{-30} \approx 2 \times 10^{-9}$ based on the binomial distribution. Therefore, when the voltage of +30V or −30V is limited to +29V or −29V by the voltage limiter 110, the error occurrence ratio in the system is relatively lower compared to the error limitation standard of $10^{-2}$ through $10^{-3}$ or $10^{-6}$.

The noise component due to the output voltage limitation of the CDMA is improved by a processing gain of the receiver, so that the error ratio at the side of the receiving becomes smaller.

Therefore, in the case of the N-number of the channels, as shown in FIG. 5A, when the output voltage is limited in the region 210 having above +K volt and the region 100 having below −K volt, if the bit error ratio is lower than 1/10 through 1/100 of the error limitation standard, the output level of the voltage limiter 110 at the level of ±K, in other words, the input voltage of the high power amplifier 140 may be limited.

FIG. 5B illustrates that the signal occurrence probability with respect to the input voltage of the high power amplifier when the output voltage of the voltage limiter 110 is limited at ±K volt. As shown therein, in the case that the voltage exceeds the +K volt at the voltage limiter 110, the +K volt signal is outputted, and in the case of below −K volts, the −K volt signal is outputted. The occurrence probability at the ±K volts is increased more slightly compared to the case when the voltage is limited.

Generally, if the peak input voltage of the high power amplifier is N-volt, the peak power of the high power amplifier may be expressed as follows:

$$PP(\text{Watt}) = A * N^2 \tag{5}$$

PP: Peak Power
A: Amplification ratio of high power amplifier
N: Input voltage of high power amplifier However, if the peak input voltage of the high power amplifier is limited to K, the peak power of the high power amplifier 140 is $A \times K^2$ watt based on Equation 5 (K<N, and the peak power of the high power amplifier 140 is decreased at a ratio of $(K/N)^2$.

In the CDMA base station transmission apparatus according to the present invention, it is possible to maintain a bit error occurrence probability by which the performance of the base station system and the reliability of the same are determined and to decreased the peak power used for the high power amplifier. Therefore, it is possible to use a non-expensive high power amplifier, and the power consumption and the size of the transceiver of the CDMA base station system are decreased.

In addition, if the high power amplifier having the same power is used, it is possible to use more subscriber channels.

The present invention is not limited to the base station transmission apparatus. Namely, the present invention may be used for a multiplex channel terminal and may be adapted for the multicode CDMA and OFDM (Orthogonal Frequency Division Multiplex) CDMA as well as the CDMA base station and terminals having large PAR.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. In a CDMA communication system, a transmission apparatus, comprising:

a high power amplifier of which an input voltage is limited in a range of satisfying a bit error occurrence standard; and a voltage limiter that limits the input voltage to the high power amplifier so as to generate an error ratio below a predetermined bit error occurrence ratio of a digital transmission system, wherein a voltage limitation level of the voltage limiter is determined on the basis of a number of multiplexed channels, an average voltage level of each channel, and a peak power of the high power amplifier.

2. The apparatus of claim 1, wherein the error ratio is between 1/10 and 1/100 of the bit error occurrence ratio of the digital transmission system standard.

3. The apparatus of claim 1, further comprising a band pass filter (BPF) that removes signals out of a predetermined band from output signals received from the voltage limiter.

4. In a CDMA communication system, a transmission apparatus, comprising:

a multiplexer that multiplexes CDMA signals inputted through a plurality of channels;

a voltage limiter that limits a voltage of the multiplexed signal to a predetermined voltage level;

an up-converter that up-converts the signal limited by the voltage limiter into a high frequency signal; and a high power amplifier that amplifies the up-converted signal to a predetermined power level, wherein a voltage limitation level of the voltage limiter is determined on the basis of the number of multiplexed channels, an average voltage level of each channel, and a peak power of the high power amplifier.

5. The apparatus of claim 4, wherein the voltage limiter generates an error ratio below a predetermined bit error occurrence ratio of a digital transmission system standard.

6. The apparatus of claim 5, wherein the errorratio is between 1/10 and 1/100 of the bit error occurrence ratio of the digital transmission standard.

7. The system of claim 4, further comprising a band pass filter (BPF) that removes signals out of a predetermined band from output signals received from the voltage limiter.

* * * * *